Aug. 31, 1943.　　　　A. ZUKOR　　　　2,328,117
SUPPORT DEVICE FOR SINKING SHIPS
Filed May 18, 1942　　　3 Sheets-Sheet 1

INVENTOR.
Arnold Zukor
BY
ATTORNEY

Aug. 31, 1943.  A. ZUKOR  2,328,117
SUPPORT DEVICE FOR SINKING SHIPS
Filed May 18, 1942  3 Sheets-Sheet 2
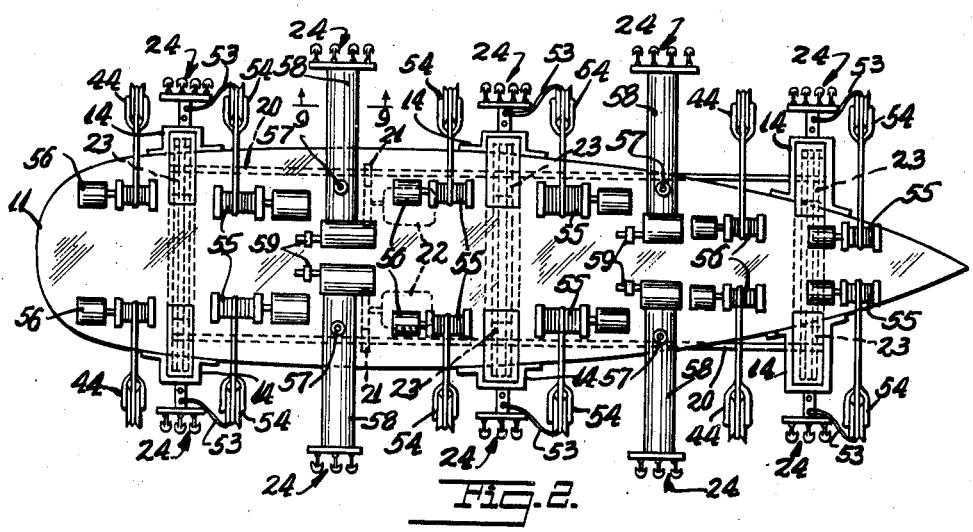
Fig. 2.
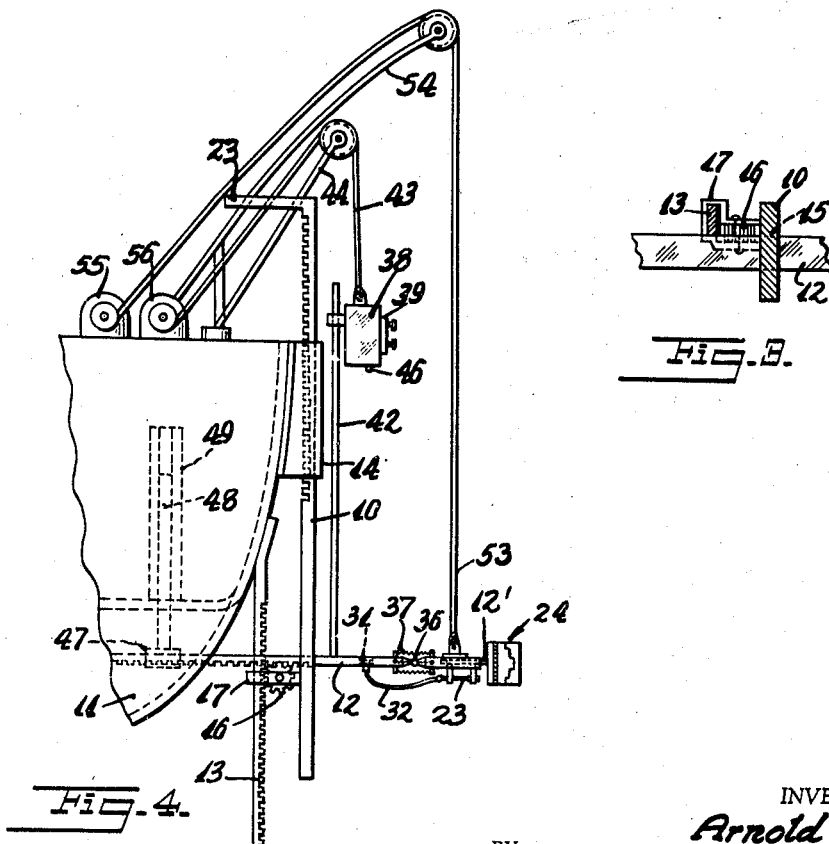
Fig. 4.
Fig. 3.
INVENTOR.
Arnold Zukor
BY
ATTORNEY Aug. 31, 1943.　　　　A. ZUKOR　　　　2,328,117
SUPPORT DEVICE FOR SINKING SHIPS
Filed May 18, 1942　　　　3 Sheets-Sheet 3
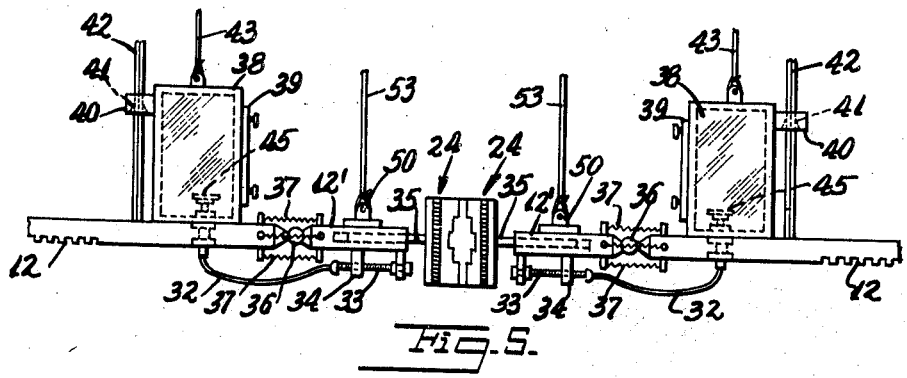
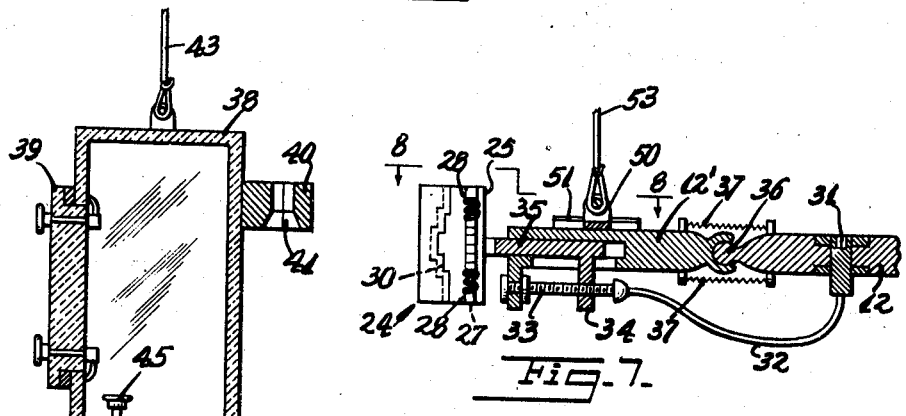
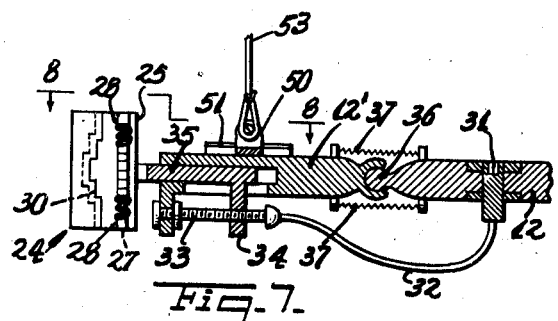
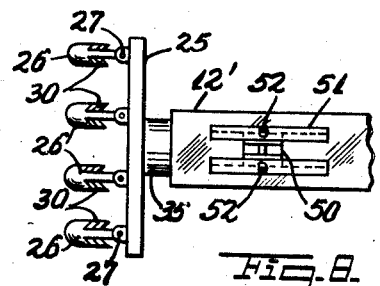
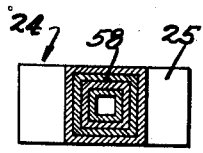
INVENTOR.
Arnold Zukor
BY
ATTORNEY Patented Aug. 31, 1943

2,328,117

UNITED STATES PATENT OFFICE 2,328,117

SUPPORT DEVICE FOR SINKING SHIPS

Arnold Zukor, Bronx, N. Y.

Application May 18, 1942, Serial No. 443,451

12 Claims. (Cl. 114—235)

This invention relates to new and useful improvements in a ship safety device.

More particularly, the invention contemplates a safety device by which rescue ships may connect with a sinking ship and keep it afloat. This is particularly valuable at the present time in view of the many sinkings of ships by submarines.

More particularly, the invention proposes to provide the ships with a plurality of racks mounted upon bottom portions thereof and connected with mechanism by which the racks may be extended, and it is proposed to provide these racks with couplings by which the racks may be connected to complementary racks on other ships. With this arrangement rescue ships may be coupled with a sinking ship beneath the water line and keep the latter afloat.

The invention also proposes to provide the ships with bridges upon their decks which may be extended across rescue ships and across a sinking ship to accommodate auxiliary rescue equipment.

The invention further contemplates the provision of glass housings for divers to observe the couplings below the surface of the sea to facilitate their quick engagement with each other.

Still further the invention proposes the use of certain universal joints between connecting parts of connected ships to allow relative movement due to the action of the waves.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure—

Fig. 2 is a plan view of one of the ships shown in Fig. 1.

Fig. 3 is a fragmentary horizontal sectional view taken on the line 3—3 of Fig. 1.

Fig. 4 is a fragmentary enlarged detailed view on one of the sides of the ship shown in Fig. 2.

Fig. 5 is an enlarged detailed view of certain of the coupling mechanism shown in Fig. 1.

Fig. 6 is a sectional view of one of the glass houses.

Fig. 7 is a sectional view of a portion of Fig. 5.

Fig. 8 is a fragmentary plan view looking in the direction of the line 8—8 of Fig. 7.

Fig. 9 is a fragmentary sectional view taken on the line 9—9 of Fig. 2.

Figure 1:
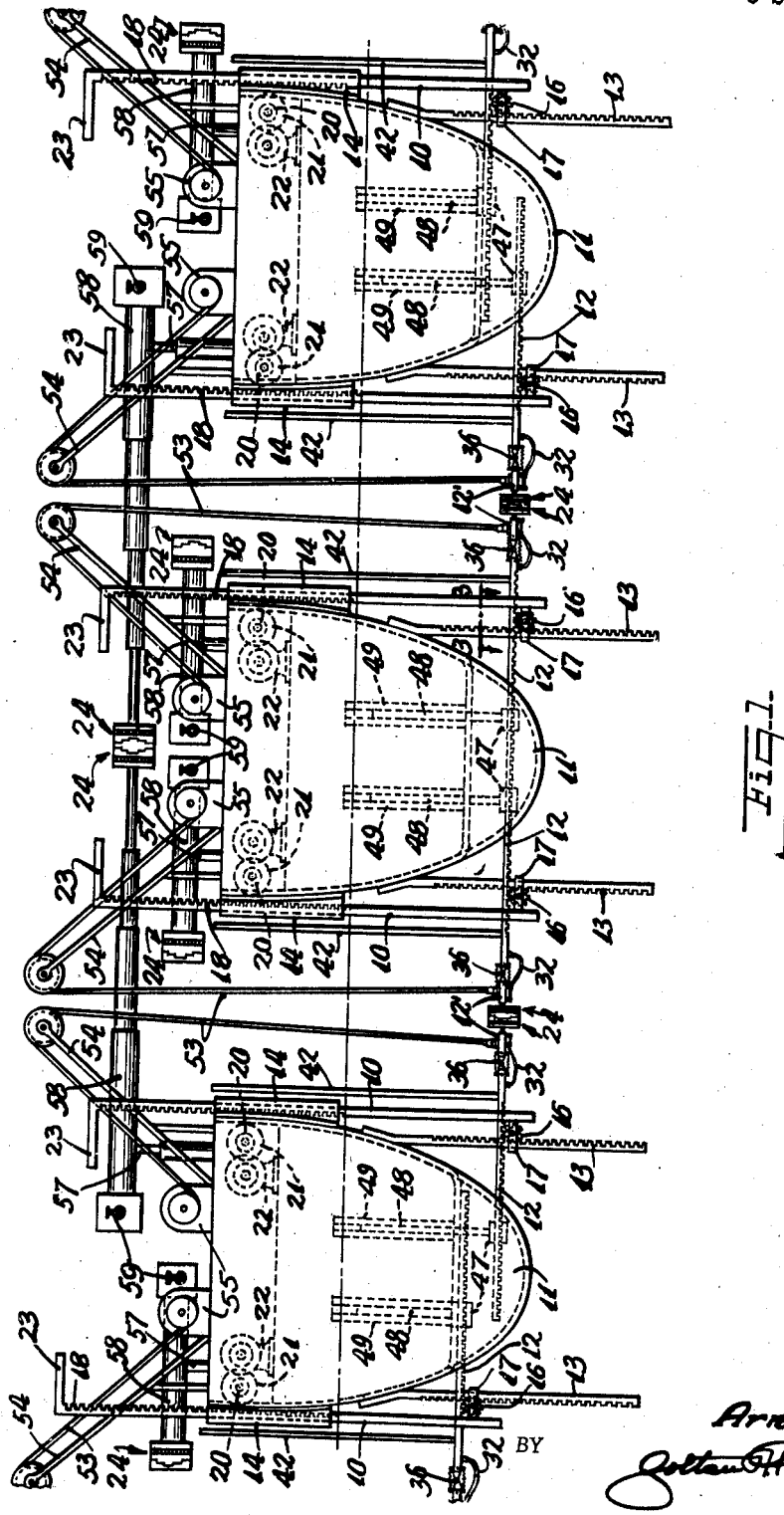
Fig. 1 is an end elevational view of a group of ships connected together in accordance with this invention.

The ship safety device, in accordance with this invention, is used in combination with the ships of a convoy and with other ships which are intended to engage in rescue work, or which are to be rescued themselves. Each ship must be equipped with a plurality of vertical bars 10 vertically slidably mounted on the outer sides of the ship, generally indicated by reference numeral 11. A plurality of horizontal racks 12 are horizontally mounted on the bottom portions of the vertical bars 10. Stationary racks 13 are mounted on the outer sides of the ship 10. The vertical bars 10 are slidably mounted on the ship 11 by tubular bearings 14 through which they pass. These bearings are mounted on the ship 11. The stationary vertical racks 13 are disposed parallel to the vertical bars 10 and are fixedly mounted at their top ends upon the sides of the ship. The horizontal racks 12 are somewhat narrower than the vertical bars 10 and pass through openings 15 in the vertical bars 10.

Gears 16 are rotatively mounted on said slidable vertical bars 10 and mesh with said vertical racks 13 and horizontal racks 12 for extending and retracting the horizontal racks as said bars 10 are moved upwards and downwards, respectively. The gears 16 are rotatively mounted on brackets 17 which are fixedly attached upon the vertical bars 10. These brackets 17 also engage around the vertical stationary racks 13 for maintaining the mesh of the gears 16 with the said vertical racks 13. The openings 15 in the bottom portions of the bars 10 are depended upon to maintain the mesh of the horizontal racks 12 with the said gears 16.

Means is provided for moving the vertical bars 10 upwards and downwards. This means includes rack teeth 18 formed along the length of the vertical bars 10 and meshing with gears 19 mounted on shafts 20 extended along the sides of the ship 11. Each shaft 20 is connected by a transmission 21 with a prime mover 22, such as an electric motor. Thus the prime mover 22 may be driven in one direction or the other for indirectly causing the vertical bars 10 to be raised or lowered. Each vertical bar 10 is provided with an offset top end 23 which acts as a stop when the vertical bar is in its completely lowered position.

Couplings 24 are mounted on the outer ends of the said horizontal racks 12 and are for the purpose of being connected with complementary couplings of another ship. Each coupling 24 includes a bracket 25 upon which a plurality of vertically extending hooks 26 are supported.

These hooks are pivotally mounted by vertical pintles 27. Springs 28 are coaxially mounted on these pintles, see particularly Fig. 7 and act to normally urge the hooks 26 resiliently into an extended position. The hooks 26 are normally parallel to each other. Each hook 26 is provided with stepped rearwardly extended gripping edges 30, see particularly Figs. 7 and 8. The purpose of this stepped construction is to prevent vertical disengagement of the hooks 26 with complementary hooks once they are engaged with each other.

Means is provided for slightly extending and retracting each coupling 24 to facilitate its engagement with a complementary coupling. This means includes a rotative socket 31 mounted on each horizontal rack 12, and connected by a flexible shaft 32 with a rotative screw 33. Each screw 33 is engaged by a follower 34 on a slide 35 which is slidably mounted and which connects with and supports the coupling 24. Each horizontal rack 12 has an outer section 12' which is connected with the main portion thereof by a universal joint 36. Several springs 37 extend across each universal joint 36 and connect the sections thereof together for resiliently holding the sections of the horizontal racks in horizontally aligned positions.

The ship safety device also includes glass housings 38 for divers to observe the couplings 24 below the surface of the sea. Each glass housing 38 has a removable door 39 through which a diver may enter. Each housing 38 has a lug 40 provided with a non-circular opening 41 engaging a non-circular rod 42 mounted on each horizontal arm 12 and extending upwards above the sea. Each glass housing 38 is connected with a hoisting cable 43 which extends over a boom 44, see particularly Fig. 4. The arrangement is such that a diver from the ship may enter the glass house 38, and then the glass house may be lowered until it comes to rest on the horizontal bar 12.

Each glass house 38 is provided with a turning tool 45 turnably mounted through the floor thereof and having a bottom portion 46 adapted to engage the socket 31. The arrangement is such that the diver within the glass housing 38, when the house is in its lowered position, as for example illustrated in Fig. 5, may operate the turning tool 35 to indirectly extend and retract the coupling 24 to make it engage the complementary coupling of another ship.

Means is provided for steadying the horizontal racks 12. This means includes sockets or tubings 47 beneath the ship 11 through which the horizontal racks 12 slidably pass. These sockets 47 may be of any desired length and are supported by rods 48 telescopically engaging guide tubes 49 built into the bottom portion of the ship. The steadying means also includes an eye member 50 slidably mounted in a short track 51 mounted on the horizontal arm section 12 and held in selected fixed positions by set screws 52, see particularly Fig. 8. A cable 53 connects with each eye member 50 and extends upwards over a boom 54 and connects with a hoisting winch 55. Each cable 43 from each glass house also connects with a hoisting winch 56.

The deck of the ship 11 is also provided with vertical hydraulic substance supports 57 which in turn support horizontal hydraulic substance bridges 58. These bridges 58 comprise telescopic tubes inter-engaged with each other and adapted to be extended and retracted with hydraulic substance in the usual way, such as generally used in hydraulic jacks. Each hydraulic substance bridge 58 is connected with a valve controlled hydraulic substance supply 59. Couplings 24 are mounted upon the outer ends of the bridges 58 for connection with complementary couplings of another ship.

The operation of the device may be best understood by examining Fig. 1 and assuming that the central ship is a sinking ship and the two side ships are the rescue ships. The rescue is carried out by divers entering the glass housings 38 and being lowered down upon the horizontal racks 12 to positions as illustrated in Fig. 5. These glass houses may also be provided with the usual telephone system to the ship by which the divers may guide the vertical extension and lowering of the vertical bars 10 to facilitate the engagement of the couplings 24 of the distressed ship with the corresponding couplings of the rescue ship. Simultaneously, the hydraulic bridges 58 of the two rescue ships are extended across the sinking ship and are connected with each other. The seamen from the rescue ships may walk along the connected bridges 58 and lower cables to the distressed ship. These cables should be suitably tied to the bridges 58 and to the distressed ship so as to prevent the latter from sinking. By this time the couplings 24 should be connected and the three ships will be coupled together, as illustrated in Fig. 1. The connected ships may now proceed to the nearest port.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship.

2. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said means for moving said vertical bars upwards and downwards comprising rack teeth formed in the vertical bars and meshing with gears, shafts connecting certain of these gears, and a prime mover for rotating these shafts in one direction or the other.

3. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, coupling on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said vertical racks being provided with openings through which the horizontal racks slidably pass.

4. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said gears being rotatively mounted on said vertical bars with brackets which engage about said stationary racks for maintaining the meshing of the gears with the stationary racks.

5. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said glass housings being connected with hoisting cables, booms and winches.

6. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said glass housings being connected with hoisting cables, booms and winches, non-circular vertical rods being mounted on said horizontal racks, and said glass houses being provided with projecting lugs having complementary non-circular openings engaging said non-circular rods for non-rotatively connecting these parts.

7. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said means for extending and retracting the couplings comprising a slidable section supporting each coupling, a screw connected to extend said slidable section, and a flexible transmission for turning said screw operative by a turning tool mounted through the floor of each glass housing.

8. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said means for steadying said horizontal racks comprising bushings slidably supporting the horizontal racks and connected with rods telescopically engaging tubes.

9. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said means for steadying said horizontal racks comprising bushings slidably supporting the horizontal racks and connected with rods telescopically engaging tubes, and cables connected with outer portions of said horizontal racks and extended over booms and connected with winches.

10. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retreating said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said vertical hydraulically operated supports being capable of rasing and lowering said bridges.

11. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housing, means for steadying said horizontal racks, vertical hydraulically operated supports on said ship, horizontal hydraulically operated bridges on said vertical supports, and couplings on the extended ends of said bridges for connecting with complementary couplings of another ship, said vertical hydraulically operated supports being capable of raising and lowering said bridges, and said bridges being capable of being extended for facilitating joining of the last mentioned couplings.

12. In combination with a ship, a plurality of vertical bars slidably mounted on the outer sides of said ship, a plurality of horizontal racks horizontally slidably mounted on bottom portions of said vertical bars, stationary vertical racks on the outer sides of said ship, gears rotatively mounted on said slidable vertical bars and meshing with said vertical and horizontal racks for extending and retracting said horizontal racks as said bars move downwards and upwards respectively, means for moving said vertical bars upwards and downwards, couplings on the outer ends of said horizontal racks for connection with complementary couplings on another ship, glass housings for divers to observe said couplings below the surface of the sea, means for extending and retracting said couplings operable from said glass housings, means for steadying said horizontal racks, vertical hydraulically operated supports on said ship, horizontal hydraulically operated bridges on said vertical supports, and couplings on the extended ends of said bridges for connecting with complementary couplings of another ship, said horizontal racks being provided with end sections connected with the main sections with universal joints.

ARNOLD ZUKOR.